(No Model.)
C. W. SPITLER & D. G. PINGLE.
HARROW AND PULVERIZER.
No. 389,985. Patented Sept. 25, 1888.
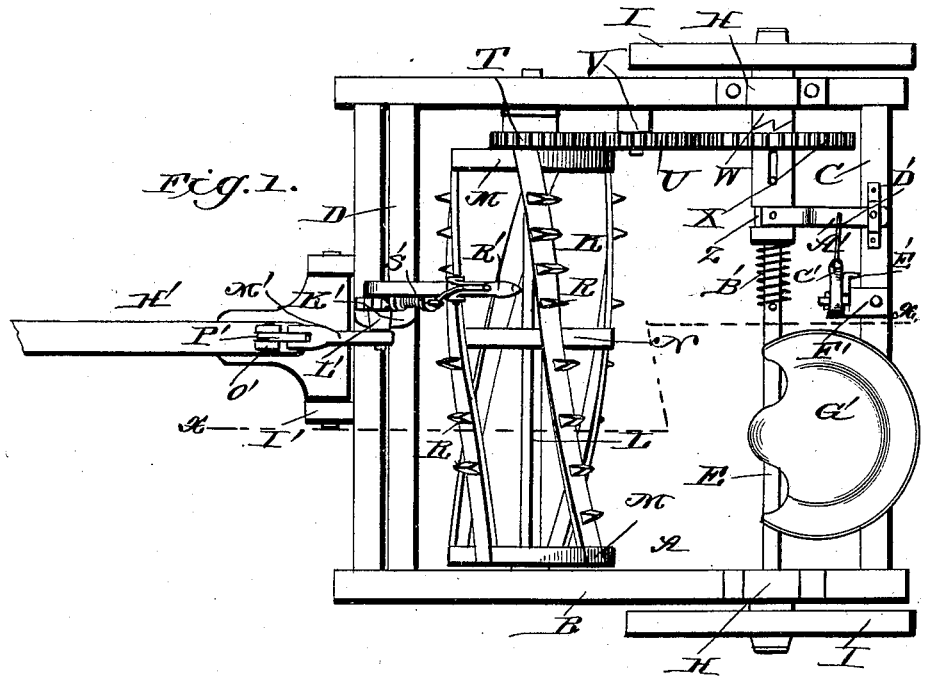
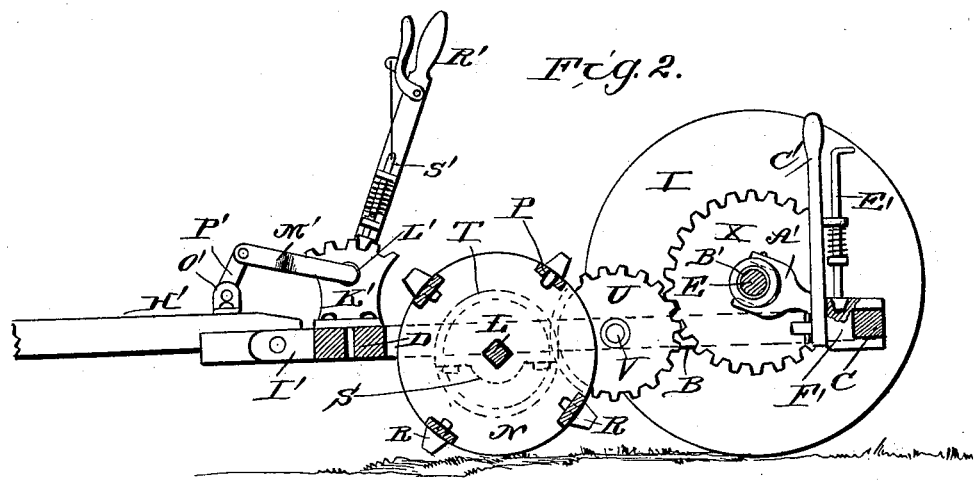
Witnesses
Jos. A. Ryan
J. W. Garner
Inventors
Cass. W. Spitler
David G. Pingle
By their Attorneys

UNITED STATES PATENT OFFICE.

CASS W. SPITLER AND DAVID GAGE PINGLE, OF VAN BUREN, OHIO.

HARROW AND PULVERIZER.

SPECIFICATION forming part of Letters Patent No. 389,985, dated September 25, 1888.

Application filed May 17, 1888. Serial No. 274,125. (No model.)

*To all whom it may concern:*

Be it known that we, CASS W. SPITLER and DAVID GAGE PINGLE, citizens of the United States, residing at Van Buren, in the county of Hancock and State of Ohio, have invented a new and useful Improvement in Harrows and Pulverizers, of which the following is a specification.

Our invention relates to an improvement in harrows and pulverizers; and it consists in the peculiar construction and combination of devices, that will be more fully set forth hereinafter, and particularly pointed out in the claim.

In the accompanying drawings, Figure 1 is a top plan view of a harrow and pulverizer embodying our improvements. Fig. 2 is a longitudinal sectional view of the same, taken on the line $x\ x$ of Fig. 1.

A represents a rectangular frame, which comprises the side beams, B, the rear connecting-beams, C, and the parallel beams D, which connect the front ends of beams B.

E represents the driving-shaft, which is arranged transversely over the frame at a suitable distance from the rear end thereof, and is journaled in suitable bearings, H, on the upper side of the frame. To the ends of the said shaft are secured driving and supporting wheels I.

K represents an open cylindrical roller, which comprises a central shaft, L, a pair of circular heads, M, near the ends of said shaft, a circular head or disk, N, arranged on the shaft midway between the heads M, and a series of spirally-arranged bars, which connect the said heads and are secured in peripheral recesses therein. Said spirally-arranged bars are provided with openings P at suitable regular distances apart, and in the said openings are inserted the shanks of harrow or pulverizing teeth or hoes R, which may be either of the form here shown or of any other suitable shape. The shaft L of the cylindrical roller is journaled in bearings S near the front end of the frame, and near one end of the said shaft is secured a spur-wheel, T.

U represents an idle-wheel, which is journaled on a spindle, V, that projects inward from one of the side beams, B, and said idle-wheel meshes with the wheel T.

The shaft E is provided near one end with a clutch-section, W.

X represents a spur-wheel, which is feathered or splined on the shaft E, has a clutch-section formed on one side, at its hub, to engage the section W, and has its hub also provided with a peripheral annular groove, Z, which is engaged by the bifurcated front end of an arm, A', the said arm having its rear end pivoted to the rear beam, C, of the frame. A spring, B', bears against one end of the hub of wheel X, and is arranged on the shaft E, the function of the said spring being to normally keep the wheel X in engagement with the clutch on the shaft and to keep the said wheel also in engagement with the idle-wheel U.

C' represents a hand-lever, which is pivoted on a spindle that projects forward from the rear beam of the frame. The said hand-lever is connected to the arm A' by means of a link, D', and the said lever C' is further provided with a locking-bolt, E', which is adapted to engage a notched sector-plate, F', or other device with which the frame is provided, so as to secure the hand-lever at any desired position. A seat, G', for the driver is mounted on a spring-arm, which is attached to the rear beam of the frame.

H' represents the tongue, which has its rear end pivoted between ears or eyebolts I', that project from the front side of the frame.

K' represents a sector-plate, which is secured on the upper side of the parallel beams D, and is provided with a series of peripheral teeth or notches. Journaled in the said sector-plate is a rock-shaft, L', which has an arm, M', at one end connected to a pair of ears, O', (which project upward from the rear end of the tongue,) by means of a link, P'.

R' represents a hand-lever, which is secured to the opposite end of the rock-shaft, and is provided with a locking-bolt, S', which is adapted to engage the sector-plate, so as to secure the said lever and the tongue at any desired elevation.

The operation of our invention is as follows: When the wheel X is in engagement with the idle-wheel and the machine is being drawn across a plowed field, the rotation of the driving-shaft E is communicated to the cylinder K, thereby causing the latter to rotate in the same direction with the driving-shaft, and the teeth of said cylinder, by engaging the plowed ground, serve to thoroughly stir and pulverize the same. By reason of the wheel X being larger than the wheel T on the pulverizing-cylinder, the latter is rotated at a higher rate of speed than the driving-shaft when the machine is in operation. When the machine is being drawn over the field and it is not desired that the same should be operated thereon, the hand-lever C' is moved so as to cause the wheel X to move inward on the driving-shaft and become disengaged from the idle-wheel, and consequently the harrowing-cylinder is rotated merely by contact with the ground.

Having thus described our invention, we claim—

The improved harrow and pulverizer herein described and shown, comprising the rectangular frame, the driving-shaft mounted in the rear portion of said frame, the driving-wheels on said shaft, the revoluble cylinder in the front end of the frame, provided with radially-projecting teeth or hoes, gear-wheels between the driving-shaft and the shaft of said cylinder, the hub of the rear gear-wheels having an annular groove, the arm A', pivoted to the rear beam of the frame and having a bifurcated front end engaging the said groove, the spindle projecting forward from said rear beam of the frame, the lever fulcrumed on said spindle, and the link D', connecting said lever to the arm A', substantially as specified.

In testimony that we claim the foregoing as our own we have hereto affixed our signatures in presence of two witnesses.

CASS W. SPITLER.
DAVID GAGE PINGLE.

Witnesses:
P. B. SHOWMAN,
S. D. SPITLER.